C. C. WEBBER.
APPARATUS FOR TRANSMISSION OF POWER.
No. 187,206. Patented Feb. 6, 1877.
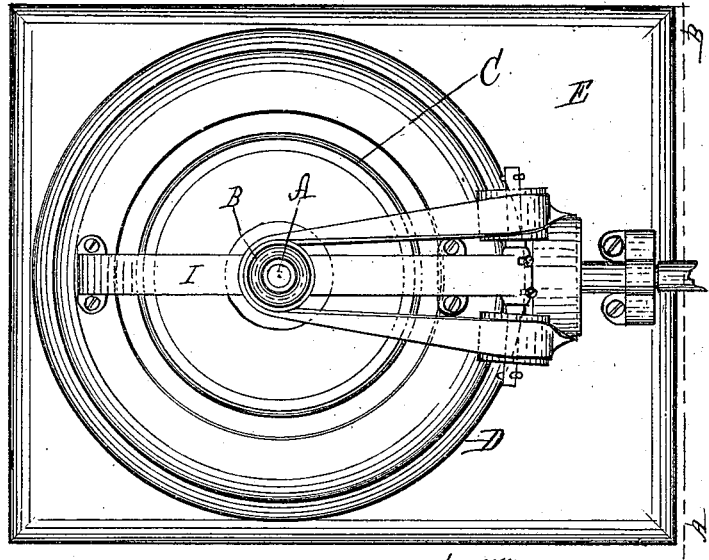
Fig. 1.
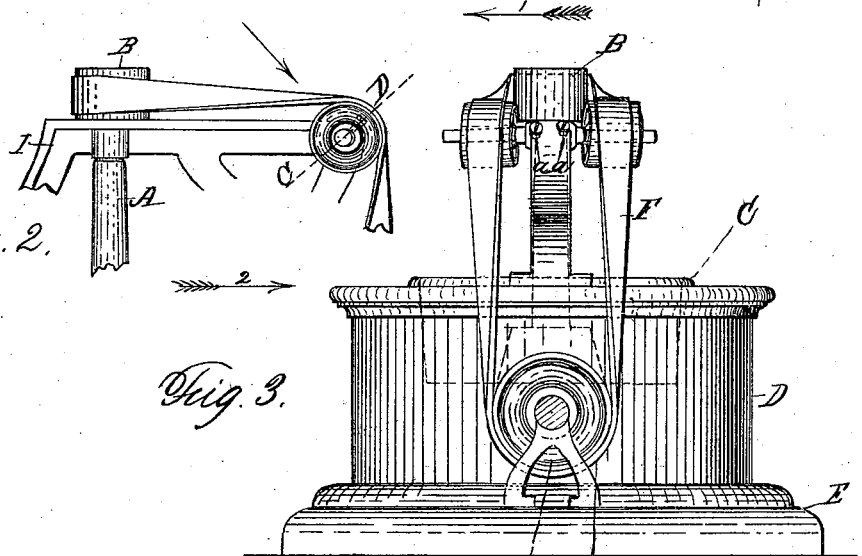
Fig. 2.
Fig. 3.
Fig. 4.
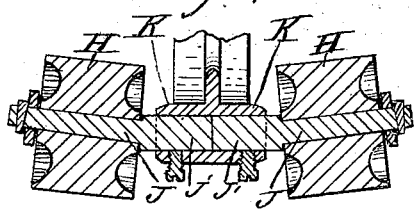
Witnesses:
Philander Moore
Porter Underwood
Inventor:
Charles C. Webber

UNITED STATES PATENT OFFICE.

CHARLES C. WEBBER, OF HOLYOKE, ASSIGNOR TO RICE, BARTON & FALES MACHINE AND IRON COMPANY, OF WORCESTER, MASSACHUSETTS.

IMPROVEMENT IN APPARATUS FOR TRANSMISSION OF POWER.

Specification forming part of Letters Patent No. 187,206, dated February 6, 1877; application filed January 17, 1876.

*To all whom it may concern:*

Be it known that I, CHARLES C. WEBBER, of Holyoke, county of Hampden, and Commonwealth of Massachusetts, have invented certain new and useful Improvements in Mechanism or Device for Transmitting Motion from a Horizontal to a Vertical Shaft, and vice versa, by means of an endless belt, without the use of flange-pulleys or stationary or rotating guides to retain the belt upon the pulleys while in operation; and I do hereby declare that the following is a full, clear, and exact description of the same, reference being had to the accompanying drawings, forming a part of this specification, and in which—

Figure 1 represents a top or plan view of my said improvement. Fig. 2 represents a side view of a portion of the apparatus shown in Fig. 1. Fig. 3 represents a section on line A B, Fig. 1; and Fig. 4 represents a section on line C D, Fig. 2.

To enable those skilled in the art to which my invention belongs to make and use the same, I will proceed to describe it more in detail.

In the drawings, A represents a vertical shaft, provided with a pulley, B, at its upper end, said shaft being shown in full lines, Figs. 1 and 2, and in dotted lines, Fig. 3. This shaft A is represented in the drawings as being connected at its lower end to a cylinder, C, which rotates in the cylindrical frame or curbing D, the latter being secured to a base, E. The parts C and D are designed to represent corresponding parts in centrifugal hydro-extractors, and need not, therefore, be further described.

Shaft A is driven by means of the endless belt F, running from the driving pulley G over guide-pulleys H H, to and around pulley B on the upper end of shaft A, which is supported in a perpendicular position by means of a suitable bearing in the frame I. Pulleys H H turn upon journals J J, which stand at an angle to their ends J' J' of said journals, which are fitted to, and are securely held in, the supporting-box K, set-screws *a* being employed for holding the ends J' J' of journals J in their proper adjusted positions, all as fully indicated in the drawings.

Box K is to form a portion of frame I, or else be securely fastened thereto.

By making the journals of pulleys H H in the manner shown and described, either journal can be adjusted independently of the other, for the purpose of causing the pulleys H H to stand in such relative positions as respects the pulleys B and G that belt F will run true from pulley G to pulley B, without the necessity of employing flanges on either of the pulleys B G or H H, or rotating or stationary guides to keep belt F in its proper position on said pulleys while in operation.

By means of my invention, motion and power can be communicated from a horizontal to a vertical shaft, and vice versa, by means of an endless belt, in an expeditious, safe, and economical manner, since all flanges and guides for keeping the belt in position or running off of the pulleys are obviated and rendered unnecessary.

It is well known to those accustomed to run endless belts from a horizontal to a vertical shaft over guide-pulleys, as such pulleys were arranged previous to my improvements for facilitating such operation, that the use of flanges and belt-guides was deemed necessary, but which flanges and guides were a source of great annoyance, as well as injury to the belt, which they chafed, and soon caused to wear or give out, all of which difficulties and objections are obviated by my said invention.

Although my invention is shown in this instance as arranged for driving the shaft of a centrifugal hydro-extractor, it is equally applicable for other purposes, when it is desired to communicate power by means of an endless belt running from a horizontal to a vertical pulley, as above described.

It will be observed that by my invention pulleys H H stand at such an angle that they guide the center of the belt from the center of the pulley G to the center of pulley B thereby causing it to run in an even and perfect manner.

Having described my improvement in devices or mechanism for facilitating the transmission of power from a horizontal to a vertical shaft, and vice versa, by means of an endless belt, what I claim therein as new and of my invention, and desire to secure by Letters Patent, is—

The combination, with the horizontal and vertical pulleys, and box K and frame I, of the independent journals J J J' J', for supporting pulleys H H, substantially in the manner and for the purpose set forth.

CHARLES C. WEBBER.

Witnesses:
PHILANDER MOORE,
PORTER UNDERWOOD.